June 17, 1930. J. GALAMB 1,763,847
BUMPER
Filed May 25, 1929 2 Sheets-Sheet 1
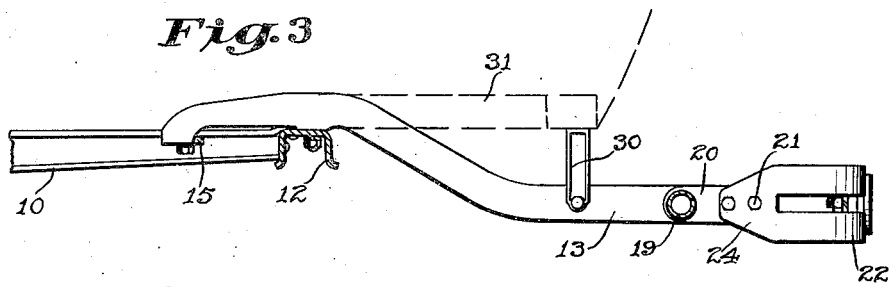
Fig.3
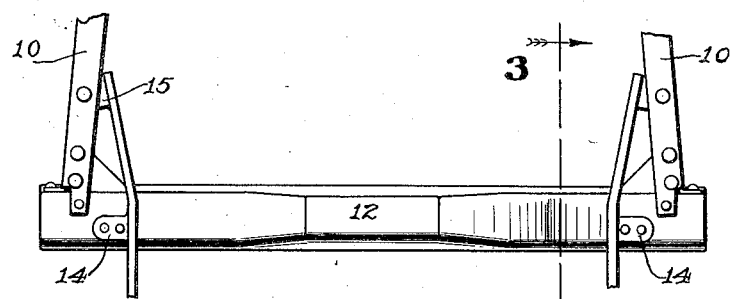
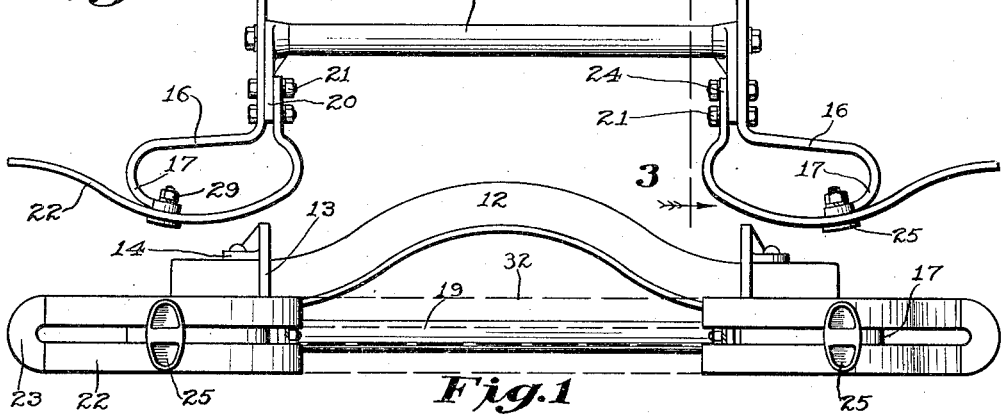
Fig.2
Fig.1
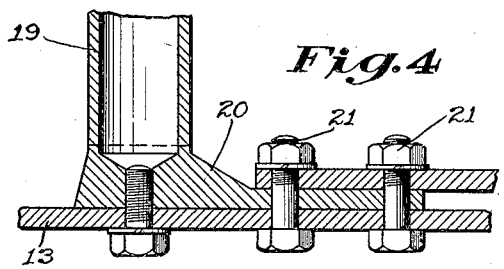
Fig.4
INVENTOR
J. Galamb
BY C. R. Halbert
E. R. Davis
ATTORNEYS June 17, 1930. J. GALAMB 1,763,847
BUMPER
Filed May 25, 1929 2 Sheets-Sheet 2
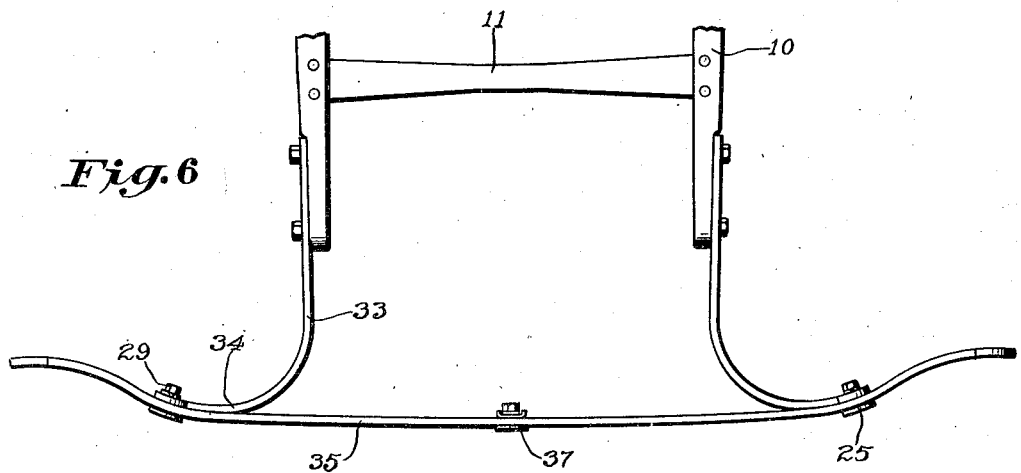
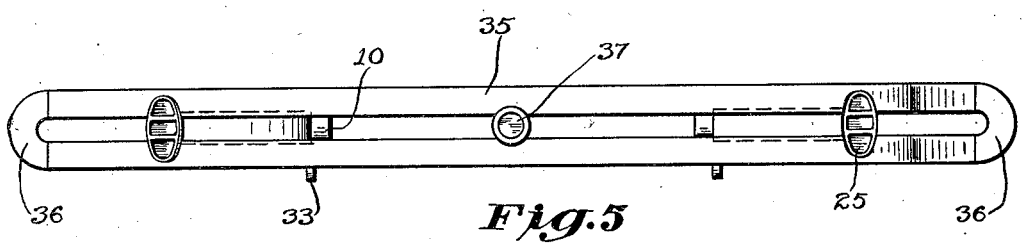
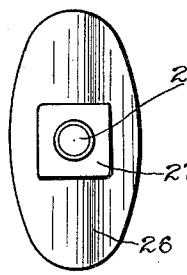
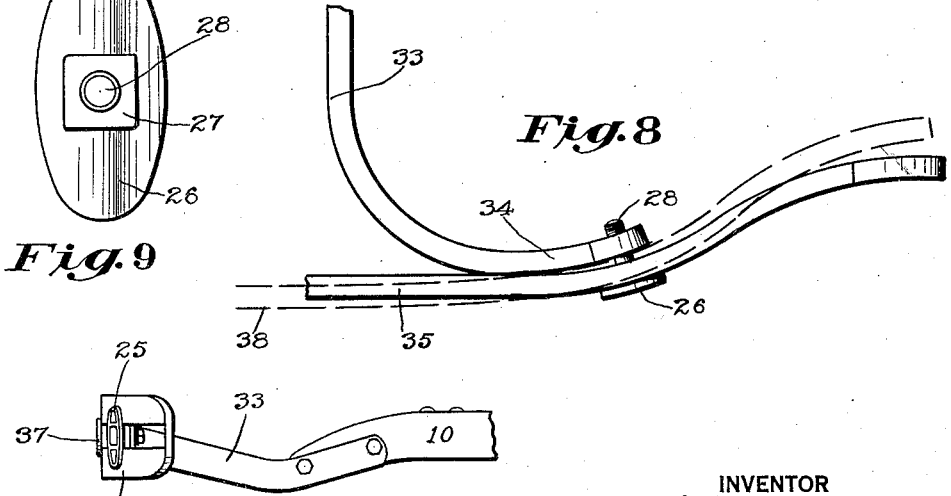
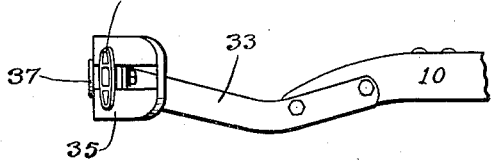
INVENTOR
J. Galamb
BY C. R. Halbert
E. L. Davis
ATTORNEYS Patented June 17, 1930

1,763,847

UNITED STATES PATENT OFFICE

JOSEPH GALAMB, OF DETROIT, MICHIGAN, ASSIGNOR TO FORD MOTOR COMPANY, OF DEARBORN, MICHIGAN, A CORPORATION OF DELAWARE

BUMPER.

Application filed May 25, 1929. Serial No. 366,024.

The object of my invention is to provide a bumper of simple, durable and inexpensive construction.

A further object of my invention is to provide a pair of forward bumper brackets having a continuous transverse bumper bar mounted thereon and a pair of rear bumper brackets having a pair of quarter bumpers or bumperettes mounted thereon, the rear brackets being so arranged that a bumper bar similar to the front bumper bar may be mounted interchangeably with the pair of bumperettes on these rear brackets.

In the ordinary automobile chassis construction, the bumper assembly is mounted on the frame of the car and if for any reason a new or different type of bumper is wanted a whole new bumper assembly must be secured. It oftens happens that purchasers of automobiles buy them equipped with bumperettes on the rear and a spare wheel between the two bumperettes. If later they desire to carry the spare wheel on the side of the car and perhaps place a trunk on the rear, a complete new rear bumper assembly is necessary in place of the quarter bumpers. In the applicant's device it is only necessary to remove the outer bars of the bumperettes and to replace these bars with a continuous bar identical with the bumper bar used on the front of car. The bumper brackets which are fastened to the frame need not be disturbed because these brackets are made to support either the bumperette or the cross bar type bumper.

A further object of my invention is to provide a bumper in which a bending stress is induced in the cross bar while in its normal position to thereby reduce vibration and to limit the deflection caused by small impact loads.

The conventional type of bumper consists of one or two bars clamped at their outer ends and secured to the bumper brackets at or near said ends. With this type of bumper road shocks and vibrations cause the bumper bars to flex between the brackets and set up objectionable noises in the bumper. In the applicant's device the bars are put under an initial bending strain when in the normal position on the car so that they are not free to vibrate to the extent of a free bar type bumper.

Still a further object of my invention is to provide a bumper consisting of two parallel cross bars connected together by welding a U shaped member at each end and secured to a bumper bar bracket at points between their ends. It has been customary in bumper construction to secure two parallel bars together at their ends by forming an eye at each end of each bumper bar and running a bolt through the pair of eyes. A spacer is generally provided around the bolt between the bumper bars to give a larger effective bumper surface. The applicant's bumper differs from this type in that the bars have no eyelets formed in the ends thereof, nor are bolts or any spacers used therewith. The U shaped end member is a very easy stamping to produce and it is not difficult to secure the bumper bars to this piece by welding or other means. This construction has the advantage that the bumper bars can never shake loose from each other or set up squeaks and rattles caused by play at these points.

Still a further object of my invention is to provide a pair of rear bumper brackets having a tubular support extending between these brackets and which is secured to these brackets in such a manner as to resist lateral movement of the brackets.

With these and other objects in view my invention consists in the arrangement, combination and construction of the various parts of my improved device, as described in the specification, claimed in the claims, and illustrated in the accompanying drawings, in which:

Figure 1 shows a rear view of a pair of rear bumperettes and bumper brackets attached to the frame of an ordinary automobile.

Figure 2 shows a top view of the bumper brackets and bumperettes shown in Figure 1.

Figure 3 shows a section taken on the lines 3—3 of Figure 2.

Figure 4 shows an enlarged sectional view of the tubular brace shown in Figure 2.

Figure 5 shows an elevation of the front bumper and bumper brackets.

Figure 6 shows a top view of the bumper shown in Figure 5.

Figure 7 shows a side elevation of the front bumper and bumper bracket.

Figure 8 illustrates diagrammatically the manner of placing the bumper bars under spring tension.

Figure 9 shows a rear view of a bumper clamp.

Referring to the accompanying drawings, I have used the reference numeral 10 to indicate generally the side frame members of an ordinary automobile frame having a front cross member 11 and a rear cross member 12 secured to the frame members 10 at the front and rear ends of the frame respectively.

The side frame members 10 do not extend rearwardly of the rear cross members and so special bumper brackets must be provided to secure the bumpers to the frame members. The applicant's bumper and bumper brackets are very strong but very light structures which extend from these frame members to positions rearwardly of the body of the car.

The rear bumper brackets are particularly illustrated in Figures 1, 2 and 3. From these figures it will be noted that the main portion of these bumper brackets consists of a relatively small bar of strip steel 13. The forward ends of these brackets 13 are turned to form a tab 15 extending at right angles to the body of the brackets so that this tab 15 may be bolted to a horizontal web of the frame members 10. The bracket 13 extends rearwardly from this tab 15 and is bowed upwardly to pass over and rest on the rear cross member frame 12. A tab 14 is formed integral with the bumper bracket above this frame member 12 and this tab is bolted to the rear cross frame member 12. By so securing these brackets 13 in place there is no strain produced on the locking bolts from the normal weight of the bumper. These two tabs being a considerable distance apart, a very rigid fastening is obtained between the frame members and the bumper brackets.

The rear end of each bracket 13 is bent outwardly at approximately right angles at 16 and the extreme outer end of this bent portion is bowed back upon itself at 17. A suitable bumper clamp extends through the end portions 17 to secure the bumperettes to these portions.

Each end of a tube 19 is provided with a foot 20 which contacts with the bracket 13 over a considerable portion of the bracket. Referring to Figure 4, the method of securing the foot 20 to the tubular member 19 is shown, together with the bolts 21 used to secure this foot to the bumper bracket 13.

The function of the member 19 and the feet 20 at the end thereof is to prevent distortion of the bumperette and the brackets 13 therefor. By referring to Figure 2 it will be seen that any blow from the rear against either or both bumperettes will tend to bend the bracket 13 adjacent to the feet 20 laterally toward the outside of the car. If only one bumperette receives the blow then the force of the impact is transmitted through the foot 20 and the cross bar 19 to both of the brackets 13 thereby translating the bending stress at the forward end of the adjacent bracket into compression on the rear end of that bracket and tension on the rear end of the other bracket.

If the force of the blow is against both bumpers, then both brackets 13 bend outwardly away from each other and the member 19 is placed under tension and through the feet 20 tends to prevent distortion of the brackets 13. This construction has the effect of making the bumperettes resist impacts in substantially the same manner as if a continuous cross bumper bar were used. This effect is secured because the bar 19 is provided with the angularly extending feet 20 which brace the bumperettes and prevent them from distorting toward either side while at the same time it is still possible to use bumperettes and have a spare wheel or tire between these bumperettes. This bar has the further function of reinforcing or acting as a backing for the spare tire or wheel so as to prevent undue distortion of the latter during impact.

Each bumperette consists of a pair of spaced parallel bars 22 secured together at their outer ends preferably by welding one arm of a U shaped member 23 to each bar. These bumperette bars are secured to an angular shaped connecting piece 24 which is secured to the foot member 20 by means of the bolts 21. The central portions of the bars 22 are secured to the bracket member 13 at its outer end by means of a suitable bumper clamp 25.

Referring to Figure 9, this bumper clamp 25 has a head portion 26 which clamps over the outside of the bumper bars 22. A squared portion 27 is disposed between the bumper bars and extends for about the thickness of the bumper bars. A screw 28 extends from the squared portion 27 and a nut 29 clamps the bumper bars in place.

Lugs 30 project upwardly from the bracket 13 midway between the foot 20 and the car 14 and are fastened onto a body sill 31. This lug 30 provides an auxiliary brace to minimize vibration and distortion of the bumper.

The foregoing description pertains to the construction of the bumperettes used on the rear of a car having a spare wheel mounted between the bumperettes. If it is desired a continuous bumper bar may be secured between the ends 17 of the extension 13 as shown by the dotted lines 32. This construction makes it possible for a purchaser of an automobile to equip his car with a spare wheel at the rear and bumperettes on each side of the wheel and, if later he desires to change the spare wheel to another position so that a trunk or the like may be placed at the rear, a continuous bumper bar may be secured to the existing brackets by removing only the bumperette bars 22 which are exposed and readily accessible and replacing these bars with a continuous bumper bar.

The side frame members 10 extend forwardly a considerable distance ahead of the cross member 11 so that only a relatively short bumper bracket need be provided for the front bumper bar. A pair of brackets 33 extend forwardly and are curved outwardly at their outer ends 34 to approximately right angles with the rear portions thereof. The bumper clamp 25 is secured in this outer end portion 34.

Referring to Figure 5, the front bumper bar assembly consists of two parallel spaced bars 35 connected at each end by a U shaped piece 36, preferably by welding. This pair of bars 35 is secured to the brackets 33 at the outer ends of the brackets, the curved portion of member 33 acting as a bumper spring.

Due to the considerable distance between the clamping points 34 on the bumper bars a movement of the center portion of these bars relative to each other is sometimes set up due to vibration and road shocks, and to counteract this movement and also to distribute the load imposed on one of the bars to the other bar, a clamping member 37, similar in construction to clamp 25, is used to secure the center portions of the two bars 35 together.

Referring to Figure 8, the free position of the bracket 34 is shown relative to the free position of the bumper bars 35. When the clamp 25 is tightened in the installed position these bumper bars 35 will assume the position shown by the dotted lines 38. The outer tips of the bars will then be distorted rearwardly while the center portion will be bowed outwardly.

The center portion then being under a bending strain will not be free to vibrate from impacts or from road shocks to the extent that a free bumper bar would vibrate. This method of securing the bumper bars and brackets together places the bolt 28 under tension which prevents squeaks and rattles from developing if the nut 29 were to become partially loosened.

Many advantages arise from the use of my improved device among which the interchangeability of the rear bumperettes with the front bumper bar is very important.

The use of the rear tubular support 19 and shoes 20 is also important.

Still a further advantage results from the shaping of the bumper bars and bumperettes so that they place the bumper clamp under tension thereby preventing rattle and vibration.

Still a further advantage results in connection with the use of the rear bumper brackets in that the principal support at the forward end thereof in their normal use press against the surface of the frame side members and the surface of the rear frame cross members whereby the normal carrying load and force of impact do not have the tendency to stretch the bolts used to secure the brackets to the frame.

Some changes may be made in the arrangement, construction, and combination of the various parts of my improved device without departing from the spirit of my invention, and it is my intention to cover by my claims such changes as may reasonably be included within the scope thereof.

I claim as my invention:

1. In an automobile bumper construction, a frame, front and rear bumper brackets mounted on said frame, a continuous bar bumper mounted on said front bumper bracket, and bumpers mounted on said rear bumper brackets, the latter being so dimensioned and shaped that said rear bumpers may be either a pair of bumperettes or a continuous bar identical with the front bumper bar.

2. In an automobile bumper construction, an automobile frame, front and rear bumper brackets secured thereto and extended therefrom, a cross bar extended between said rear bumper brackets in position spaced forwardly from the rear end thereof, a continuous bar bumper supported from said front bumper brackets, and bumpers supported on said rear bumper brackets, the parts being so shaped and dimensioned that the rear bumpers may be either a pair of bumperettes or a continuous bar identical with the front bumper bar and the cross bar being adapted to transmit impact stresses from one rear bracket to the other when the bumperettes are used.

3. In an automobile bumper construction, a pair of spaced longitudinally parallel brackets, a frame, means for securing said brackets to said frame, a transverse brace having feet at each end thereof extended parallel with said bumper brackets, means for securing said feet to said bumper brackets in position intermediate of the ends thereof, and spaced bumpers mounted on the ends of said brackets, the parts being so arranged that the transverse brace will prevent flexing of the bumper brackets relative to each other adjacent to the connection of said bumpers.

4. In an automobile bumper construction, a frame, a pair of spaced parallel brackets mounted on said frame and extended rearwardly therefrom, a transverse brace having feet at either end thereof, means for securing said transverse brace to said brackets with the feet extending parallel with a portion of the brackets forwardly of the rear end thereof, and bumpers each mounted on the end of one of the brackets and on one of said feet, the parts being so arranged that impact against said bumpers will not cause said bumper brackets to be distorted relative to each other.

5. In an automobile bumper, a pair of spaced bumper brackets, a bumper bar, and means for securing said bumper bar to said bumper brackets so that the center portion of said bar will be flexed outwardly from its normal shape when clamped on said bumper brackets.

6. In an automobile bumper construction, a frame, a pair of bumper brackets extending therefrom, said brackets having securing faces thereon extending in planes substantially perpendicular to the longitudinal axis of the frame, a bumper bar, and means for clamping said bumper bar to the securing faces, the parts being so disposed and proportioned that the bumper bar will be flexed somewhat from its normal free shape when it is clamped to said bumper brackets whereby the bumper bar may be held by its inherent resiliency from vibration and rattle may be prevented.

7. In an automobile bumper construction, a frame having a pair of side members and a rear cross member, a body sill mounted on said frame and extending rearwardly therefrom, a pair of bumper brackets each having a plurality of securing lugs extending therefrom, and means for securing the lugs on each bracket respectively to a side frame member and a rear cross frame member and the body sill.

8. In a bumper construction, a frame having side and rear members, a body sill mounted on said frame and extending rearwardly therefrom, a bumper bracket, a lug at the forward end thereof adapted to press upwardly against the portion of a side frame member, a lug thereon adapted to rest on said cross frame member, and a lug adapted to be suspended from said body member.

JOSEPH GALAMB.